United States Patent
Hefner, Jr. et al.

(10) Patent No.: US 10,590,239 B2
(45) Date of Patent: Mar. 17, 2020

(54) POLYMER INCLUDING TROGER'S BASE AND ISATIN MOIETIES AND HAVING INTRINSIC MICROPOROSITY

(71) Applicant: Dow Global Technologies LLC, Midland, MI (US)

(72) Inventors: Robert E. Hefner, Jr., Rosharon, TX (US); Ian A. Tomlinson, Midland, MI (US); Brian L. Cramm, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/573,966

(22) PCT Filed: Jul. 31, 2017

(86) PCT No.: PCT/US2017/044602
§ 371 (c)(1),
(2) Date: Nov. 14, 2017

(87) PCT Pub. No.: WO2018/048515
PCT Pub. Date: Mar. 15, 2018

(65) Prior Publication Data
US 2019/0194394 A1 Jun. 27, 2019

Related U.S. Application Data

(60) Provisional application No. 62/393,134, filed on Sep. 12, 2016.

(51) Int. Cl.
C08G 73/06 (2006.01)
B01D 71/62 (2006.01)

(52) U.S. Cl.
CPC ......... *C08G 73/0694* (2013.01); *B01D 71/62* (2013.01); *B01D 2325/02* (2013.01)

(58) Field of Classification Search
CPC .... C08G 73/0694; B01D 71/62; B01D 71/72; B01D 2325/02; C08J 3/24; C08J 9/36; C08J 2205/044; C08J 2379/08
See application file for complete search history.

(56) References Cited

U.S. PATENT DOCUMENTS

| | | | |
|---|---|---|---|
| 5,629,084 A | 5/1997 | Moya | |
| 7,410,525 B1 | 8/2008 | Liu et al. | |
| 7,485,173 B1 | 2/2009 | Liu et al. | |
| 7,690,514 B2 | 4/2010 | McKeown et al. | |
| 7,758,751 B1 | 7/2010 | Liu et al. | |
| 7,771,857 B2 | 8/2010 | Fritsch et al. | |
| 7,806,962 B2 | 10/2010 | Liu et al. | |
| 7,943,543 B1 | 5/2011 | Liu et al. | |
| 8,048,198 B2 | 11/2011 | Liu et al. | |
| 8,056,732 B2 | 11/2011 | McKeown et al. | |
| 8,132,677 B2 | 3/2012 | Liu et al. | |
| 8,575,414 B2 | 11/2013 | Liu et al. | |
| 8,613,362 B2 | 12/2013 | Liu et al. | |
| 8,623,928 B2 | 1/2014 | Du et al. | |
| 8,686,104 B2 | 4/2014 | Du et al. | |
| 8,809,488 B2 | 8/2014 | Du et al. | |
| 8,814,982 B2 | 8/2014 | Liu et al. | |
| 8,894,859 B2 | 11/2014 | Livingston et al. | |
| 8,969,628 B2 | 3/2015 | Priske et al. | |
| 9,018,270 B2 | 4/2015 | McKeown et al. | |
| 9,126,185 B2 | 9/2015 | Laskoski | |
| 9,238,202 B2 | 1/2016 | Liskey et al. | |
| 2004/0198587 A1 | 10/2004 | McKeown et al. | |
| 2006/0246273 A1 | 11/2006 | McKeown et al. | |
| 2007/0209505 A1 | 9/2007 | Liu et al. | |
| 2009/0031897 A1 | 2/2009 | Liu et al. | |
| 2009/0120875 A1 | 5/2009 | Liu et al. | |
| 2009/0155464 A1 | 6/2009 | Liu et al. | |
| 2010/0130634 A1 | 5/2010 | Fritsch | |
| 2012/0157743 A1 | 6/2012 | Liu et al. | |
| 2012/0273421 A1 | 11/2012 | Perry et al. | |
| 2013/0085191 A1* | 4/2013 | Laskoski | B01J 27/188 521/53 |

(Continued)

FOREIGN PATENT DOCUMENTS

| | | |
|---|---|---|
| KR | 20150027605 | 3/2015 |
| WO | 2005113121 | 12/2005 |

(Continued)

OTHER PUBLICATIONS

Grogojo et al., Adv. Funct. Mater. 2014, 24, 4729-4737.
Fritsch et al., Journal of Membrane Science 401-402 (2012) 222-231.
Xiaohua Ma et al., Synthesis and Gas Transport Properties of Hydroxyl-Functionalized Polyimides with Intrinsic Microporosity, Macromolecules, vol. 45, No. 9 (May 8, 2012).
Xiaohula Ma et al., Novel Spirobifluorene and Dibromospirobifluorene-based Polyimides of Intrinsic Microporosity for Gas Separation Applications, Macromolecules, vol. 46, No. 24, (Dec. 23, 2013).

(Continued)

*Primary Examiner* — Shane Fang

(57) ABSTRACT

A polymer comprising a sub-unit represented by Formula I:

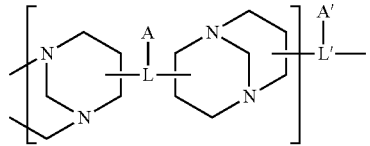

wherein:
L is independently selected from at least one arylene group, and a multi-ring moiety,
L' is independently selected from L or is not present,
A and A' are not present or are independently selected from an isatin moiety with the proviso that at least one of A and A' is selected from an isatin moiety.

9 Claims, No Drawings

(56) References Cited

U.S. PATENT DOCUMENTS

| | | |
|---|---|---|
| 2013/0112619 A1 | 5/2013 | Livingston et al. |
| 2013/0146538 A1 | 6/2013 | Liu et al. |
| 2013/0172433 A1 | 7/2013 | McKeown et al. |
| 2013/0217799 A1 | 8/2013 | Visser et al. |
| 2013/0247756 A1 | 9/2013 | Li et al. |
| 2013/0267616 A1* | 10/2013 | McKeown ............. C08G 12/08 521/27 |
| 2014/0251897 A1 | 9/2014 | Livingston et al. |
| 2014/0255636 A1 | 9/2014 | Odeh et al. |
| 2015/0148439 A1 | 5/2015 | Eddaoudi et al. |
| 2015/0165383 A1 | 6/2015 | Liskey et al. |
| 2015/0239806 A1 | 8/2015 | Wendland |

FOREIGN PATENT DOCUMENTS

| | | |
|---|---|---|
| WO | 2012035327 | 3/2012 |
| WO | 2012035328 | 3/2012 |
| WO | 2014186108 | 11/2014 |
| WO | 2015018576 | 2/2015 |
| WO | 2015095026 | 6/2015 |
| WO | 2015095034 | 6/2015 |
| WO | 2015095044 | 6/2015 |
| WO | 2015129925 | 9/2015 |
| WO | 2016148869 | 9/2016 |
| WO | 2016161367 | 10/2016 |
| WO | 2016195977 | 12/2016 |
| WO | 2016206008 | 12/2016 |
| WO | 2017030450 | 2/2017 |
| WO | 2017091357 | 6/2017 |

OTHER PUBLICATIONS

Fu Yun Li et al., High-Performance Thermally Self-Cross-Linked Polymer of Intrinsic Microporosity (PIM-1) Membranes for Energy Development, Macromolecules, vol. 45, No. 3, (Feb. 14, 2012).

Du Xin et al: "Troger's base-functionalised organic nanoporous polymer for heterogeneous catalysis", Chem. Comm, Dec. 14, 2009 (Dec. 14, 2009), pp. 970-972.

\* cited by examiner

POLYMER INCLUDING TROGER'S BASE AND ISATIN MOIETIES AND HAVING INTRINSIC MICROPOROSITY

FIELD

The invention relates to polymers having intrinsic microporosity, particularly polymers including a sub-units including a Troger's base and isatin moieties. The subject polymers have particular utility as membranes useful in gas and liquid separations.

INTRODUCTION

Polymers with intrinsic microporosity (PIMs) are characterized by having macro-molecular structures that are both rigid and contorted so as to have extremely large fractional free volumes. Examples include poly(1-trimethylsilyl-1-propyne) (PTMSP), poly(4-methyl-2-pentyne) (PMP) and polybenzodioxane (PIM-1). Because of their exceptional free volume, all are extremely permeable. See: Baker, Membrane Technology and Applications, 3$^{rd}$ ed., (2012), and Polymers of Intrinsic Microporosity, Enc. Polymer Sci. & Tech., (2009)—both by John Wiley & Sons Ltd. See also: WO2005/113121; US2004/01985587; US2013/0146538; US2013/0172433; US2013/0267616; US2014/0251897; U.S. Pat. Nos. 9,018,270; 8,623,928; 8,575,414; 8,056,732; 7,943,543; 7,690,514 and 7,410,525 which are incorporated herein in their entirety. By way of example, US2014/0251897 describes a thin layer composite membrane including a thin selective layer of a networked microporous polymer having intrinsic microporosity formed via an interfacial polymerization of monomers having concavity (e.g. spirobisindanes, bisnapthhalenes, ethanoanthracenes). Similarly, U.S. Pat. No. 9,018,270 describes an interfacial polymerization technique for preparing thin film composite membranes including a thin layer of PIMs. In one embodiment, the polymer includes a repeating unit including a Troger's base moiety, e.g.

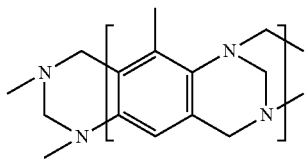

See also D. Xin et al., "Troger's base-functionalised organic nanoporous polymer for heterogeneous catalyst," Chem Comm (2009) pp. 970-972, which provides a description of the preparation of so-called Troger's base nanoporous polymers and their use as catalyst in the addition reaction of diethyl zinc to an aromatic aldehyde.

SUMMARY

The present invention includes "Troger's base" polymers (and copolymers) having intrinsic microporosity and corresponding methods for making the same. The term "Troger's base polymer" refers to polymers including sub-units (and preferably repeating units) having a Troger's base moiety as represented by Formula I. In distinction to the polymers described in U.S. Pat. No. 9,018,270, the present invention includes isatin subunits as represented by Formula I'. Several embodiments are further distinguished by the incorporation of polar functional groups and/or thermosetting groups capable of reacting to form covalent crosslinks along with corresponding covalently crosslinked polymers. Covalently crosslinked embodiments have superior stability as compared with corresponding ionically crosslinked polymers. Embodiments including combinations of different polar functional groups provide a synthetic pathway for preparing polymers possessing novel solubility and processing characteristics along with unique reactivity characteristics.

In one embodiment, the invention includes a polymer including a sub-unit (or repeating unit) represented by Formula I:

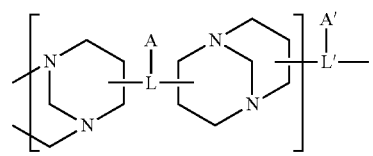

wherein:

L is independently selected from at least one arylene group, e.g. a ring fused to the Troger's base moiety (e.g. phenylene,) or a multi-ring moiety (preferably comprising from 2 to 4 rings) fused to the Troger's base moiety, e.g. biphenylene, diphenyl ether, naphthalene and spirobisindane, and L' is independently selected from L or is not present (i.e. L' simply represents a bond linkage to an adjacent sub-unit or repeating unit;

wherein L and L' may be optionally substituted with at least one of: i) a crosslinking bond and ii) a polar functional group capable of reacting to form a crosslinking bond, including for example: carboxylic acid and sulfonic acid and their corresponding salt or ester, cyanate and hydroxyl, and combinations thereof; and A and A' are not present or are independently selected from an isatin moiety with the proviso that at least one of A and A' is selected from an isatin moiety. A representative isatin moiety is provided as Formula I'.

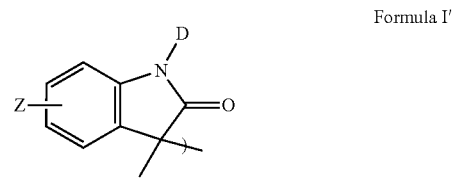

Formula I' wherein Z is selected from: hydrogen, cyanate, hydroxyl, alkyl, aryl, (e.g. phenyl), arylene or heteroarylene (a ring fused to the aromatic ring of the isatin moiety), alkyl ether, nitro, nitrile, carboxylic acid and sulfonic acid and their corresponding salt or ester, and D is selected from: hydrogen and alkyl (wherein the alkyl group may be unsubstituted or substituted with a hydroxyl, carboxylic acid, sulfonic acid and their corresponding salt or ester).

In additional embodiments, the invention includes thin films, coatings and membranes made using the subject polymers, including B-stage and network forms of the polymers useful in the formation of such films, coatings and membranes.

In preferred embodiments, the subject polymers address one or more of the shortcomings associated with known PIMs technology, e.g. increased membrane durability, rejection, fouling resistance, rigidity and dimensional stability leading to better maintenance of nanoporous structure under varied end uses conditions, better tolerance toward functional groups needed to enhance selectivity, improved processability and fabrication, higher glass transition temperature, higher thermal stability, higher thermooxidative stability, increased moisture resistance, increased corrosion resistance to acids and bases, and organic solvent resistance.

DETAILED DESCRIPTION

In a preferred embodiment, the subject polymers (also including copolymers, collectively referred to herein as "polymers") possess intrinsic microporosity. The term "intrinsic microporosity" refers to a polymer having a continuous network of interconnected intermolecular voids which form as a direct consequence of the shape and rigidity of at least a portion of the component monomers of the polymer. The term "microporous" refers to a material having an interconnected system of voids of a diameter less than 2 nm as defined by IUPAC. Preferably, the subject polymers have average pore diameters of from 0.2 to 20 nm as determined by standard bubble point test (e.g. ASTM F316-03 (2011)). The copolymers also have high apparent surface areas (e.g. greater than 100 $m^2/g$, and more preferably greater than 150 $m^2/g$ as determined by the Brunauer-Emmett-Teller (BET) method.

In several embodiments, the subject polymers are B-stage copolymers and network copolymers. The term "B-stage" is defined as "an intermediate stage in a thermosetting resin reaction in which the plastic softens but does not fuse when heated, and swells but does not dissolve in contact with certain liquids", see McGraw-Hill Dictionary of Scientific & Technical Terms, 6E, Copyright 2003 by The McGraw-Hill Companies, Inc. The term "network" is defined as a covalently crosslinked 3-dimensional polymer network in contrast to a "non-network polymer" or linear polymer which does not have a covalently crosslinked 3-dimensional network.

Membranes made using the subject polymers may be formed by conventional techniques, e.g. casting, in-situ polymerization upon a porous support, dip coating and subsequent polymerization onto a porous support, etc. Such membranes are useful in separations based upon the relative rates of mass transfer of different species across a membrane. A driving force, typically a pressure or a concentration difference, is applied across the membrane so that selected species preferentially pass across the membrane. The membranes may be used for purification, separation or adsorption of a particular species (e.g. salts, organics, ionic species) in the liquid (e.g. aqueous, organic) or gas phase. In particular, the subject membranes exhibit excellent pH and solvent stability and as a consequence, are suitable for use in a wide range of applications including: gas separation, ion exchange, water softening, water purification, ultra high purity water production in applications such as electronics, metal separation including rare earths, catalysis, remediation of mining waste water, uranium processing, leach mining, and processing of liquids in dairy, sugar, fruit juice and pharmaceuticals and ethanol production in a continuous fermentation/membrane pervaporation system. In specific embodiments, the subject copolymers include hydrophilic functional groups, e.g. carboxylic acid, that provide improved selectivity in many applications.

The subject membrane is not particularly limited to a specific type, construction or application. For example, the subject polymers may be fabricated into to flat sheet (film), tubular and hollow fiber configurations that find utility in a variety of applications including gas separations, pervaporation, forward osmosis (FO), reverse osmosis (RO), nano filtration (NF), ultra filtration (UF), micro filtration (MF) and pressure retarded fluid separations. One preferred design is a thin film composite structure. See, for example, WO 2005/113121 and US2014/0251897. With a thin film composite design a "thin film" of the subject polymer is formed upon a support using well known techniques, e.g. dip coating, casting, etc., a solution of the subject polymer and conducting a phase separation (e.g. via quench, cooling, etc.) to form the desired porosity. The resulting membrane may be further subject to heating to facilitate crosslinking By way of a more specific example, the composite membrane may include a bottom layer (back side) of a nonwoven backing web (e.g. PET scrim), a middle layer of a porous support having a typical thickness of about 25-125 μm and top layer (front side) comprising a thin film polymer layer having a thickness typically less than about 1 micron, e.g. from 0.01 micron to 1 micron but more commonly from about 0.01 to 0.1 μm. The porous support is typically a polymeric material having pore sizes which are of sufficient size to permit essentially unrestricted passage of permeate but not large enough so as to interfere with the bridging over of a thin film polymer layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, cross-linked polyacrylonitrile, poly(methyl methacrylate), polyethylene, polypropylene, polyether ether ketone and various halogenated polymers such as polyvinylidene fluoride. For most applications, the porous support provides strength but offers little resistance to fluid flow due to its relatively high porosity.

The invention includes polymers having intrinsic microporosity and membranes made therefrom. In one embodiment, the invention includes a polymer including a sub-unit (and more preferably a repeating unit) represented by Formula I:

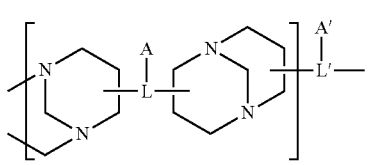

Formula I wherein:

L is independently selected from at least one arylene group, e.g. a ring fused to the Troger's base moiety (e.g. phenylene,) or a multi-ring moiety (preferably comprising from 2 to 4 rings) fused to the Troger's base moiety, e.g. biphenylene, diphenyl ether, naphthalene and spirobisindane, and L' is independently selected from L or is not present (i.e. L' simply represents a bond linkage to an adjacent sub-unit or repeating unit;

L and L' may be optionally substituted with at least one of: i) a crosslinking bond and ii) a polar functional group capable of reacting to forming a crosslinking bond, including for example: carboxylic acid and sulfonic acid and their corresponding salt or ester, cyanate and hydroxyl, and combinations thereof; wherein the term "polar" as used herein refers to a functional group having an electronegativity of from 0.4 to 1.7 on the Pauling scale with representative polar functional groups including: carboxylic acid and sulfonic acid and their corresponding salt or ester, cyanate and hydroxyl, and combinations thereof.

In a preferred set of embodiments, L' is represented by one of the following:

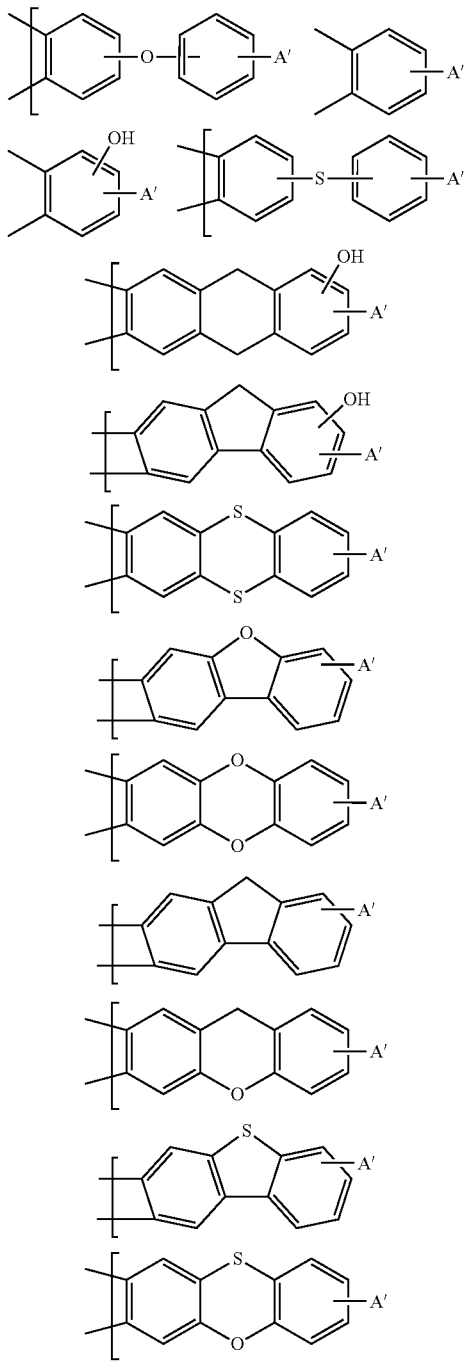

wherein A and A' are not present or are independently selected from an isatin moiety with the proviso that at least one of A and A' is selected from an isatin moiety. A preferred isatin moiety is represented by Formula I', where Z and D are as defined above:

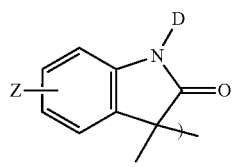

Formula I'

In a preferred embodiment L is a fused aromatic ring substituted with an isatin moiety of Formula I' or a polar functional group capable of reacting to form a covalent crosslinking bond, including for example: carboxylic acid and sulfonic acid and their corresponding salt or ester, cyanate and hydroxyl, and combinations thereof. An example is represented by Formula I" (a) and (b) (and other isomers not shown) wherein X and Y are defined below.

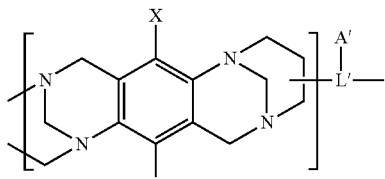

Formula I"(a)

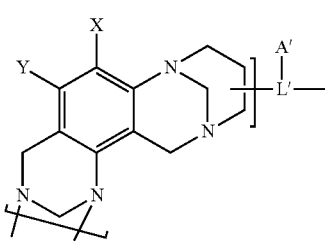

Formula I"(b)

Representative examples of preferred polymers (and copolymers) include those having repeating units as represented in the following formulae (wherein L is shown: phenylene, biphenylene, and spirobisindane, respectively),

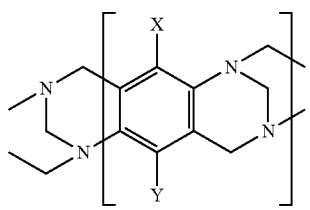

Formula II

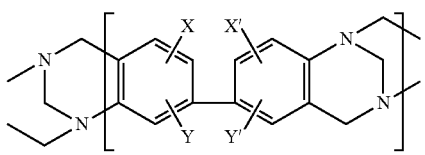

Formula III

Formula IV

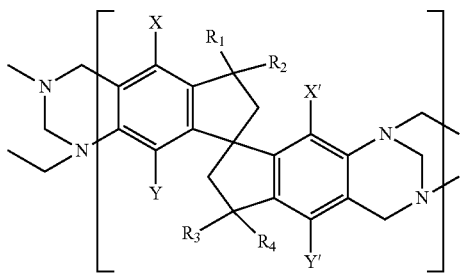

wherein:

X, Y, X' and Y' are independently selected from: A, hydrogen, carboxylic acid and sulfonic acid and their corresponding salt or ester, cyanate and hydroxyl with the proviso that at least one of X, Y, X' and Y' is A; and $R_1$, $R_2$, $R_3$, and $R_4$ are independently selected from: hydrogen, alkyl groups comprising from 1 to 6 carbon atoms, and $R_1$ and $R_2$ may collectively form a ketone group or a 9,9'-fluorene group, and $R_3$ and $R_4$ may collectively form a ketone group or a 9,9'-fluorene group. In a preferred embodiment the polymer is covalently crosslinked through at least one of X, X', Y and Y'.

Troger's base compounds, such as those described in Angewandte Chemie International Edition, volume 50, issue 10, pages 2401-2404, 8 Feb. 2011 DOI: 10.1002/anie.201007162 and Prelog, V.; Wieland, P. (1944). "Über die Spaltung der Tröger'schen Base in optische Antipoden, ein Beitrag zur Stereochemie des dreiwertigen Stickstoffs", Helvetica Chimica Acta 27 (1): 1127-1134, (1944) may be employed in the present invention. These compounds may co-polymerizated with an isatin monomer, bis(isatin) monomer, poly(isatin), or mixture thereof.

Most any isatin may be used as a monomer in the present invention. For example, isatin monomers can be generally prepared by the methods described by Charles M. Clay, Hagar M. Abdallah, Carly Jordan, Kyle Knisley, Daniel M. Ketcha, Archive for Organic Chemistry, volume 2012, issue 6, 317-325; Simon J. Garden, Jose C. Tones, Leonardo E. da Silva, Angelo C. Pinto, Synthetic Communications, 28(9), 1679-1689 (1998); Franciso Martinez, Herbert Naarmann, Synthetic Metals, 39, 195-203 (1990); Copolla, G. M., Journal of Heterocyclic Chemistry, 24, 1249-1251 (1987). The main isatin synthesis is the method of Sandmeyer which involves reaction of an aniline with chloral hydrate and hydroxylamine hydrochloride in aqueous sodium sulfate to form an isonitrosoacetanilide which is treated with sulfuric acid after its isolation, see: M. Alam, M. Younas, M. A. Zafar, Naeem, Pak. J. Sci. Ind. Res. 32, 246 (1989) (CA 112:7313u); S. J. Garden, J. C. Tones, A. A. Ferriera, R. B. Silva, A. C. Pinto, Tetrahedron Letters, 38, 1501 (1997); W. Prinz, A. Kayle, P. R. Levy, J. Chem. Res (S), 116 (1978). In a similar synthesis, isatins may also be prepared via cyclization of nitroacetanilides in acidic media to give isatin 3-oximes, see: T. Kearney, P. A. Harris, A. Jackson, J. A. Joule, Synthesis 769 (1992). The "Stolle" procedure involves reaction of an aniline with oxalyl chloride to provide a chlorooxalylanilide intermediate which is cyclized to the isatin using a Lewis acid, see: W. M. Bryant, III; G. F. Huh; J. H. Jensen; M. E. Pierce; Synthetic Communications, 23, 1617 (1993); Y. Fukuda, Y. Itoh, K. Nakatani, S. Terashima, Tetrahedron, 50 2793 (1994). The Gassman procedure involves synthesis of a 3-methyl-2-oxindole and its oxidation to the isatin, see: P. G. Gassman, B. W. Cue, Jr; T. Y. Luh; J. Org. Chem., 42, 1344 (1977); P. G. Gassman, K. M. Halweg, J. Org. Chem., 44, 628 (1979); S. W. Wright, L. D. McClure, D. L. Hageman, Tetrahedron Letters, 37, 4631 (1996). The "Martinet" synthesis involves reaction of an aminoaromatic compound with an oxomalonate ester (or hydrate thereof) in acid media to form a 3-(3-hydroxy-2-oxindole)carboxylic acid followed by oxidative decarboxylation to the isatin, see: K. C. Rice, B. J. Boone, A. B. Rubin, T. J. Rauls, J. Med. Chem. 19, 887 (1976); A. Taylor, J. Chem Res., 347 (1980). Directed ortho-metalation of a N-pivaloyl or N-(t-butoxycarbonyl)aniline followed by reaction with diethyl oxalate, then deprotection and cyclization of the resultant α-ketoester intermediate provides the corresponding isatin, see: P. Hewawasam, N. Meanwell, Tetrahedron Letters, 35, 7303 (1994); C. Rivalle, E. Bisogni, Journal of Heterocyclic Chemistry, 34, 441 (1997); K. Smith, G. A. El-Hiti, Hawes, A. C., Synlett, 945 (1999). A one-pot synthesis of isatins is accomplished via reaction of ethyl nitroacetate with a substituted benzene compound in polyphosphoric acid, see: N. A. Aksenov, A. V. Aksenov, I. V. Aksenova, Yu. I. Smushkevich, Chemistry of Heterocyclic Compounds, volume 49, issue 4, 645-647 (July, 2013). Numerous other useful syntheses of isatins are known. Additionally, bridged isatin monomers can be used and can be generally prepared by the methods described by David St. C. Black, Angus J. Hartshorn, Michael Homer, Siegfried Hünig, Aust. J. Chem., 30, 2493-2514 (1977); Larry E. Overman, Emily A. Peterson, Tetrahedron, 59, 6905-6919 (2003); David St. C. Black, Corrie H. Bos Vanderzalm, Angus J. Hartshorn, Aust. J. Chem., 30, 225-229 (1977); David St. C. Black, G. Ian Moss, Aust. J. Chem., 40, 129-142 (1987); Charles M. Clay, Hagar M. Abdallah, Carly Jordan, Kyle Knisley, Daniel M. Ketcha, volume 2012, issue 6, 317-325; Simon J. Garden, Jose C. Tones, Leonardo E. da Silva, Angelo C. Pinto, Synthetic Communications, 28(9), 1679-1689 (1998).

Spirobisindane monomers may also be used in the polymerization of the subject polymers. Spirobisindane monomers may be prepared using the methods described by Chen, W-F.; Lin, H-Y.; Dai, S. A.; Organic Letters, 6, 14, 2341-2343 (2004); Faler, G. R.; Lynch, J. C.; U.S. Pat. No. 4,701,566 (Oct. 20, 1987); Ito, M.; Iimuro, S.; U.S. Pat. No. 5,339,783 (Mar. 21, 1995); Curtis, R. F.; Lewis, K. O.; J. Chem. Soc., 418-421 (1962); Baker, W.; J. Chem. Soc., 1678-1681 (1934); Fisher, C. H.; Furlong, R. W.; Grant, M.; Journal of the American Chemical Society 58, 820-822 (1936); Baker, W.; Besly, D. M.; J. Chem. Soc., 1421-1424 (1939); Baker, W.; Besly, D. M.; J. Chem. Soc., 347-353 (1938), Ma, X; Swaidan, Y. B.; Zhu, Y.; Litwiller, E.; Jouiad, I. P.; Han, Y.; Macromolecules, 45, 3841-3849 (2012); Li, S.; Jo, H. J.; Han, S. H.; Park, C. H.; Kim, S.; Budd, P. M.; Lee, Y. M.; Journal of Membrane Science, 434, 137-147 (2013).

In a preferred subset of embodiments, X is A and X', Y and Y' are hydrogen or hydroxyl. The subject polymers may be prepared using known starting materials and techniques. Several representative reaction pathways are provided below.

Reaction Pathway I

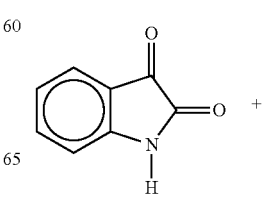

-continued

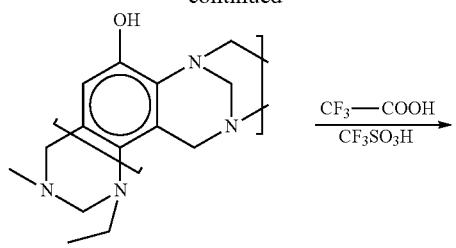

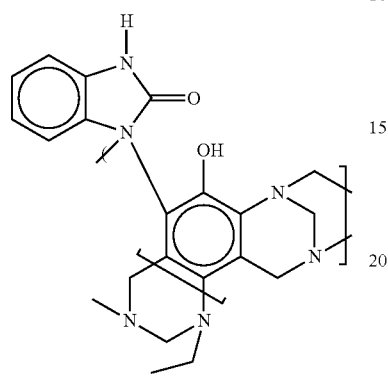

Reaction Pathway II

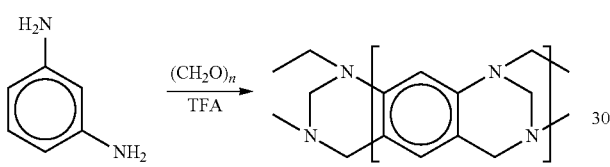

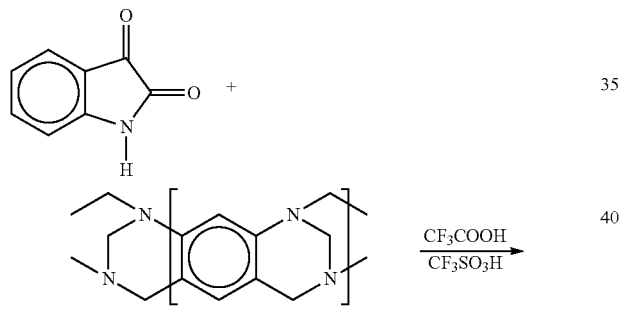

Reaction pathway III

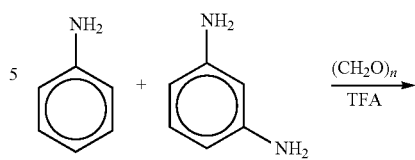

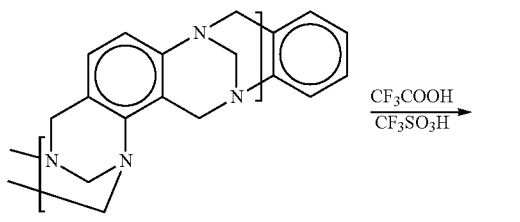

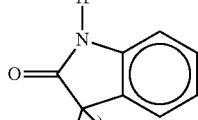

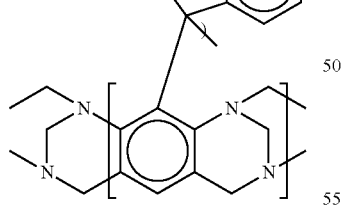

Reaction pathway IV

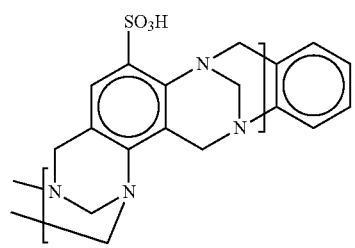

In another preferred subset of embodiments, A is not present, A' is an isatin moiety, and X, Y, X' and Y' are independently selected from: hydrogen, carboxylic acid and sulfonic acid and their corresponding salt or ester, cyanate and hydroxyl with the proviso that at least one of X, Y, X' and Y' is selected from: carboxylic acid and sulfonic acid and their corresponding salt or ester, cyanate and hydroxyl. The subject polymers may be prepared using known starting materials and techniques. Several representative reaction pathways are provided below.

-continued
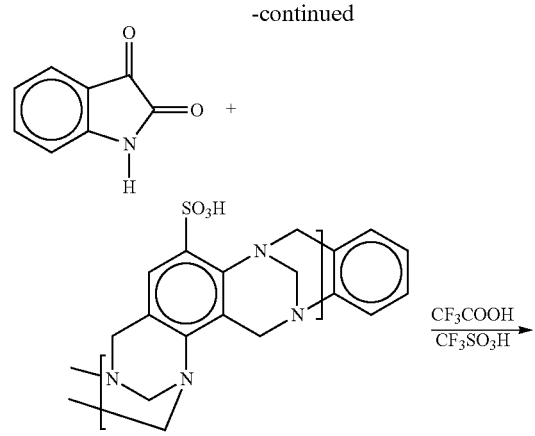
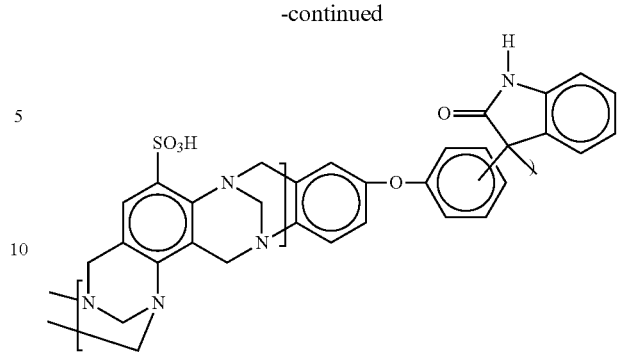
Reaction pathway VI
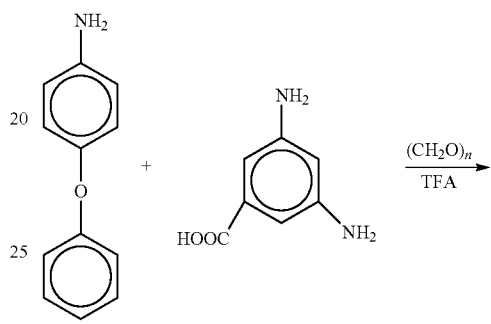
Reaction pathway V
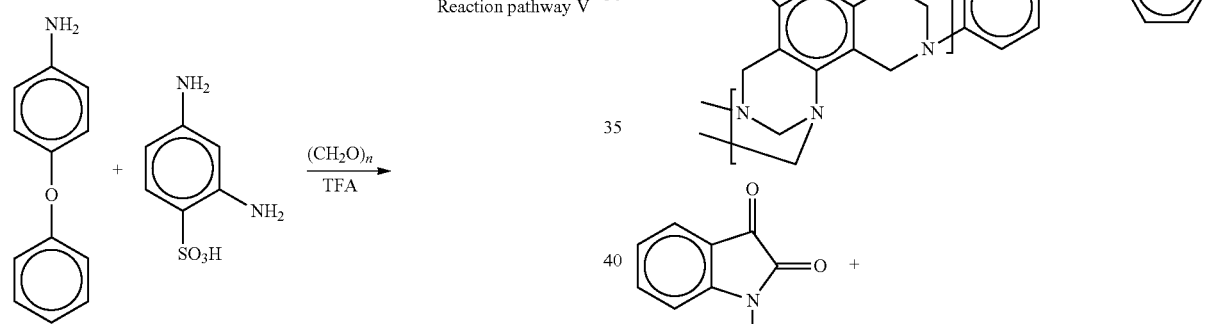
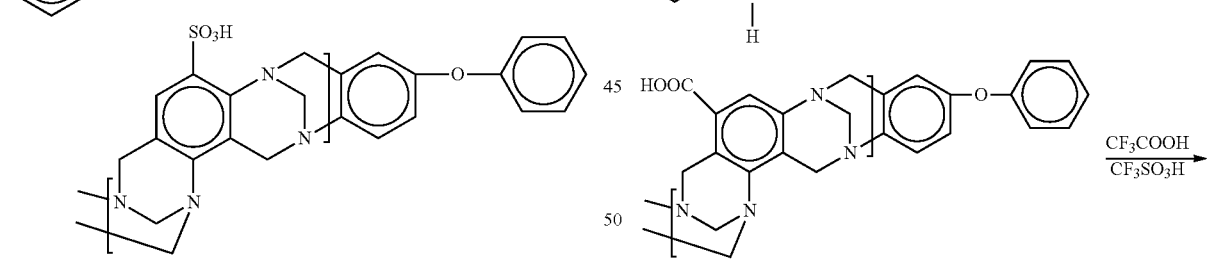
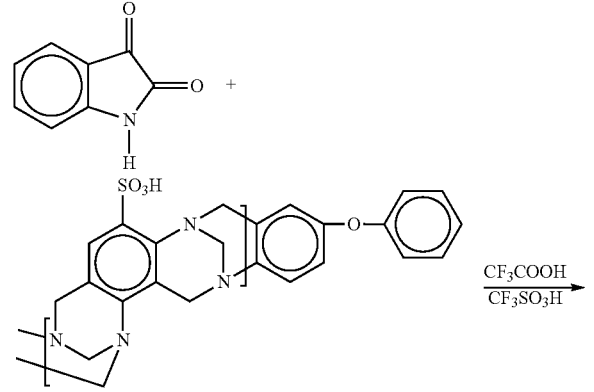
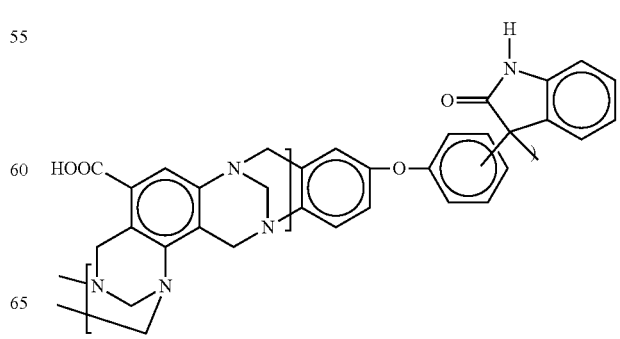

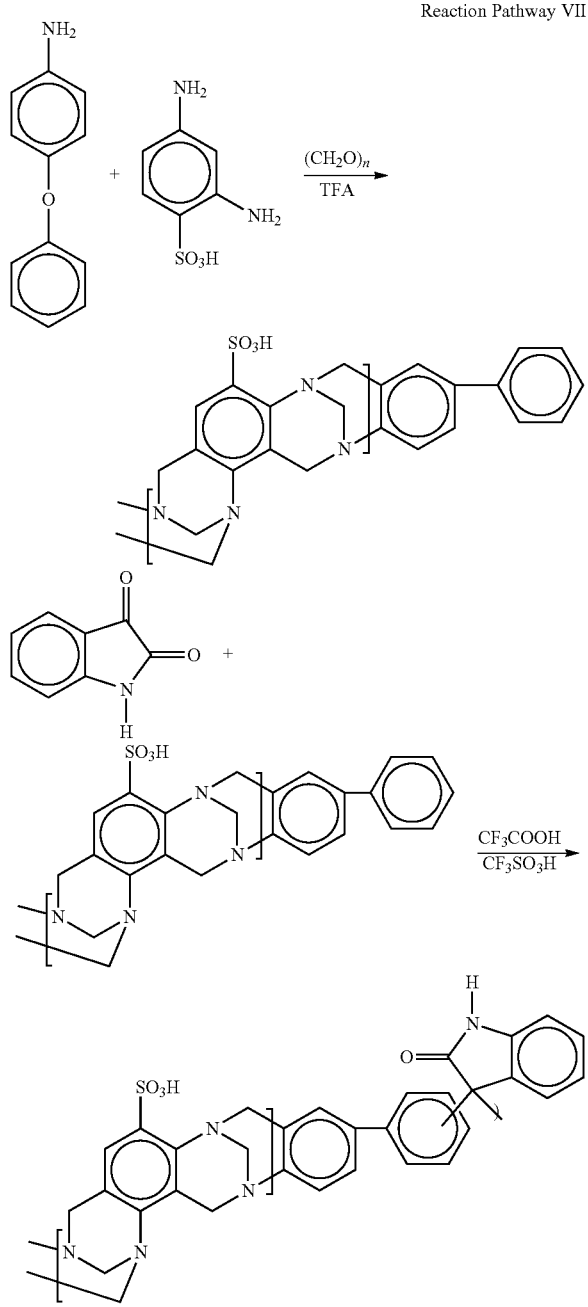

Reaction Pathway VII

The subject polymers may include additional repeating units or branching, i.e. be formed via a copolymerization; however, the subject polymers preferably comprise at least 50 molar %, 75 molar % and more preferably at least 90 molar % of repeating units represented by Formula I (e.g. 50-100 molar %, 75-100 molar % and 90 to 100 molar % of the subject monomers).

A number of variations of the polymer synthesis are useful for modifying the physical and mechanical properties of the polymer. These variations include structural changes in the comonomers employed and changes in the stoichiometric ratio of comonomers employed. Examples of structural changes in the comonomers employed include addition of one or more substituents the "L" moiety and variations of comonomers. Changes in the stoichiometric ratio of comonomers employed include: variations in equivalent ratio of comonomers used (can markedly change molecular weight and/or crosslink density), inclusion of additional comonomers. The functionalization of the finished polymers, e.g., to introduce N-hydroxyalkyl, N-carboxyalkyl or N-alkyl sulfonic acid substituents, makes a good extension on the membrane separation application. The high hydrophilicity and surface charge are preferred for higher selectivity in gas separations, or water flux and solute rejection in liquid separations.

Many classic techniques for crosslinking polymers are applicable for crosslinking the subject polymers, e.g. amide formation can be adapted for crosslinking of the copolymers containing carboxylic acid groups. Formation of the amide typically requires activation of the carboxylic acid moiety with a coupling reagent. This activation converts the hydroxyl group of the carboxylic acid to a suitable leaving group, thus avoiding formation of a carboxylic acid salt with the amine reactant. The reaction of the activated intermediate with the amine is the coupling reaction and the activator used is the coupling reagent, see Han, S.-Y.; Kim, Y.-A. Tetrahedron 60, 2447 (2004). Depending upon the specific chemistry used, the reactive acylating agent may be formed in a separate reaction and then reacted with the amine or it may be formed in situ by adding the activating agent to the mixture of carboxylic acid and amine reactants. Additives, such as N-hydroxysuccinimide and 1-hydroxybenzotriazole, that enhance the reactivity of the coupling reagent, may also be used. A specific example is an additive that forms an active ester with the carboxylic acid, such as an O-acylisourea or a benzotriazole active ester. Coupling reagents may be prepared by reaction of a carboxylic acid ester to a hydrazide which is then further reacted with nitrous acid or an alkyl nitrite to give the azide for reaction with the amine reactant. Diphenylphosphoryl azide can perform coupling in the presence of a base as a single high yield step, see Shioiri, T.; Ninomiya, K.; Yamada, S.; J. Am. Chem. Soc. 94, 6203 (1972). Reaction of a carboxylic acid phosphinothioester with an azide provides a iminophosphorane that rearranges to an amido phosphonium salt which hydrolyzes to the amide, see Nilsson, B. L.; Hondal, R. J.; Soellner, M. B.; Raines, R. T.; J. Am. Chem. Soc. 125, 5268 (2003). A mixed anhydride, for example, generated via reaction of pivaloyl chloride with the carboxylic acid group, is then reacted with the amine reactant to produce the amide. Ethyl chloroformate or isobutyl chloroformate are also used for synthesis of mixed carbonic anhydrides. A separate reaction of the carboxylic acid with the chloroformate is typically followed by reaction of the resultant mixed carbonic anhydride with the amine compound. Mixed ethyl carbonic anhydrides can be synthesized via reaction of a carboxylic acid with 1-ethoxycarbonyl-2-ethoxy-1,2-dihydroquinoline in the presence of the amino component as a single step direct coupling, see Belleau, B.; Malek, G.; J. Am. Chem. Soc. 90 (1968).

Carboxylic acids may be crosslinked by a primary amine compound in the presence of a carbodiimide compound to prepare an oligomer or polymer simultaneously containing nanoporosity. In the reaction, one or more carboxylic acid groups are reacted with one or more primary amine containing compounds (monoamine, diamine, and/or polyamines may be used) and one or more carbodiimide crosslinking agents. For crosslinking in aqueous media, a water-soluble carbodiimide is employed, such as 1-ethyl-3-(-3-dimethylaminopropyl) carbodiimide hydrochloride. For crosslinking in non-aqueous media, an organic solvent soluble carbodiimide is employed, such as N',N'-dicyclohexyl carbodiimide In the crosslinking chemistry, the carbodiimide reacts with carboxylic acid group to form an active O-acylisourea intermediate that is easily displaced by nucleophilic attack from a primary amino group in the reaction mixture. Reaction with the primary amine results in an amide bond formed with the original carboxyl group, with the carbodiimide by-product released as an urea derivative. 1-Ethyl-3-(-3-dimethylamino propyl) carbodiimide hydrochloride crosslinking is most efficient in acidic (pH 4.5) conditions and must be performed in buffers devoid of extraneous carboxyls and amines 4-Morpholinoethanesulfonic acid buffer is a suitable carbodiimide reaction buffer. Phosphate buffers and neutral pH (up to 7.2) conditions are compatible with the reaction chemistry, but with lower efficiency.

B-staging or prepolymerization of copolymerizable mixtures wherein at least one thermosettable moiety is present can be accomplished by using lower temperatures and/or shorter curing times and/or reduced catalyst concentration. Curing of the thus formed B-staged (prepolymerized) copolymers can then be accomplished at a later time or immediately following B-staging (prepolymerization) by increasing the temperature and/or curing time.

One preferred class of embodiments of the present invention includes Troger's base polymers including an "L" moiety substituted with a cyanate group. Such "polycyanates" may be prepared by reacting one or more of Troger's base polymers containing phenolic hydroxyl groups with a stoichiometric quantity or a slight stoichiometric excess (up to about 20 percent excess) of a cyanogen halide per phenolic hydroxyl group in the presence of a stoichiometric quantity or a slight stoichiometric excess (up to about 20 percent excess) of a base compound per phenolic hydroxyl group and in the presence of a suitable solvent. Reaction temperatures of from about −40° C. to about 60° C. are operable, with reaction temperatures of −15° C. to 10° C. being preferred, and reaction temperatures of −10° C. to 0° C. being most preferred. Reaction times can vary substantially, for example, as a function of the reactants being employed, the reaction temperature, solvent(s) used, the scale of the reaction, and the like, but are generally between 15 minutes and 4 hours, with reaction times of 30 minutes to 90 minutes being preferred. Suitable cyanogen halides include cyanogen chloride and cyanogen bromide. Alternately, the method of Martin and Bauer described in Organic Synthesis, volume 61, pages 35-68 (1983) published by John Wiley and Sons can be used to generate the required cyanogen halide in situ from sodium cyanide and a halogen such as chlorine or bromine. Suitable base compounds include both inorganic bases and tertiary amines such as sodium hydroxide, potassium hydroxide, trimethylamine, triethylamine, mixtures thereof, and the like. Triethylamine is most preferred as the base. Suitable solvents for the cyanation reaction include water, aliphatic ketones, chlorinated hydrocarbons, aliphatic and cycloaliphatic ethers and diethers, aromatic hydrocarbons, mixtures thereof and the like. Tetrahydrofuran, acetone, methylethylketone, methylene chloride or chloroform are particularly suitable as the solvent.

Such polycyanates may be crosslinked, ("cured" or "thermoset") by heating from about 50° C. to about 400° C. (preferably from 100° C. to 250° C.), optionally in the presence of a suitable catalyst. Suitable catalysts include, for example, acids, bases, salts, nitrogen and phosphorus compounds, such as for example, Lewis acids such as $AlCl_3BF_3$, $FeCl_3$, $TiCl_4$, $ZnCl_2$, $SnCl_4$; protonic acids such as HCl, $H_3PO_4$; aromatic hydroxy compounds such as phenol, p-nitrophenol, pyrocatechol, dihydroxynaphthalene; sodium hydroxide, sodium methylate, sodium phenolate, trimethylamine, triethylamine, tributylamine, diazabicyclo [2.2.2] octane, quinoline, isoquinoline, tetrahydroisoquinoline, tetraethylammonium chloride, pyridine-N-oxide, tributyl phosphine, zinc octoate, tin octoate, zinc naphthenate, cobalt naphthenate, cobalt octoate, cobalt acetylacetonate and the like. Also suitable as catalysts are the metal chelates such as, for example, the chelates of transition metals and bidentate or tridentate ligands, particularly the chelates of iron, cobalt, zinc, copper, manganese, zirconium, titanium, vanadium, aluminum and magnesium. These and other operable catalysts are disclosed in U.S. Pat. Nos. 3,694,410 and 4,094,852 which are incorporated herein by reference in their entirety. Cobalt naphthenate, cobalt octoate and cobalt acetylacetonate are most preferred as the catalysts. The quantity of catalyst used, if any, depends on the structure of the particular catalyst, the structure of the polycyanate being cured, the cure temperature, the cure time, and the like. Generally, catalyst concentrations of from about 0.001 to about 2 percent by weight are preferred. The cured (thermoset) products prepared from the polycyanates possess the cyanate group homopolymerization structure, (the polytriazine ring) unless other functionalities are present in the polycyanate that participate in the curing process.

EXAMPLES

The following examples illustrate representative synthetic routes for preparing various embodiments of the invention. The identity of each polymer was confirmed by thermogravimetric analysis (TGA), differential scanning calorimetry (DSC) and matrix-assisted laser desorption/ionization (MALDI) mass spectrometry (MS).

Example 1: Copolymerization of Isatin and Phenol Terminated Troger's Base Polymer of 2,4-Diaminophenol dihydrochloride; 4-Aminophenol; and Paraformaldehyde According to Reaction Pathway VIII

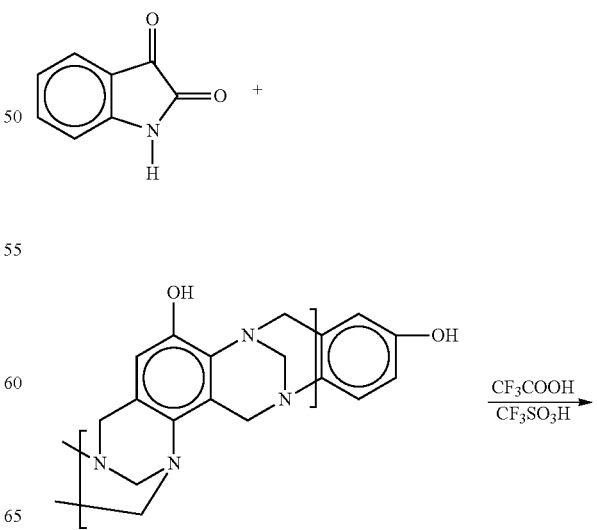

-continued

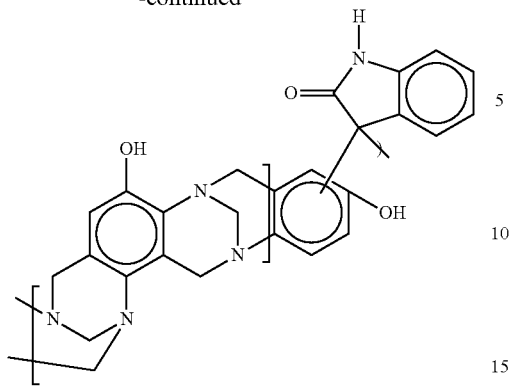

Approximately 0.50 g of the phenol terminated hydroxy functional Troger's base polymer shown above was combined with approximately 0.22 g of the isatin shown above along with 30 mL of trifluoroacetic acid (TFA). The mixture was stirred to produce a dark amber colored solution. Trifluoromethane sulfonic acid (TFMSA), 0.95 g, was then added and the mixture was sealed and stirred over overnight and then transferred to a vessel containing ice and mechanically stirred, followed by successive additions of a 20% NaOH solution until the pH of the mixture was approximately 7, after which aqueous HCl was added to adjust the pH to approximately 4. The resulting slurry was gravity filtered over paper and allowed to air dry. The resulting solid was combined with 15 mL of tetrahydrofuran, sealed and stirred overnight. The resulting slurry was gravity filtered over paper and air dried, and then maintained at 100° C. under vacuum overnight. The resulting product was a medium brown colored powder. The powder was analyzed using TGA and DSC (TA Instruments Q500 and Q100), and MALDI MS. TGA under nitrogen gave an onset of transition temperature (Td), end of Td, and volatiles (% weight) lost up to onset to Td after prehold at 150° C. for 60 minutes of 223° C., 263.7° C., and 5.98%, respectively. No events were detected by DSC analysis from 0° C. to 175° C. under nitrogen.

The expanded MALDI spectrum from 1040-1660 Dalton gave masses at 1074.5, 1088.6, 1102.6, 1116.6, and 1130.6 for copolymer of isatin with phenol terminated hydroxyl functional Troger's base polymer. The following copolymer structure was proposed for the mass observed at 1130.6 Dalton:

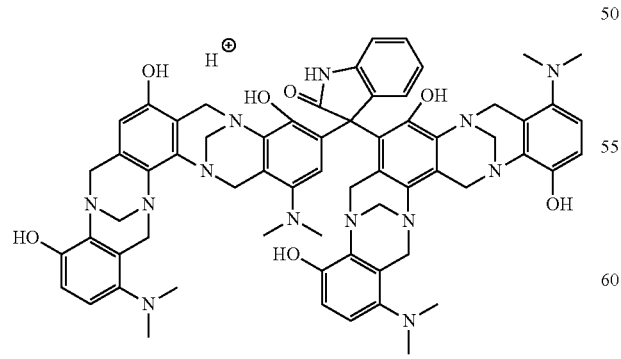

Chemical Formula: $C_{64}H_{68}N_{13}O_7^+$
Exact Mass: 1130.53592

The expanded MALDI spectrum from 550-760 Dalton provided additional copolymer structures which were proposed based on masses observed at 590.3, 604.3, 618.3, and 632.3 Dalton:

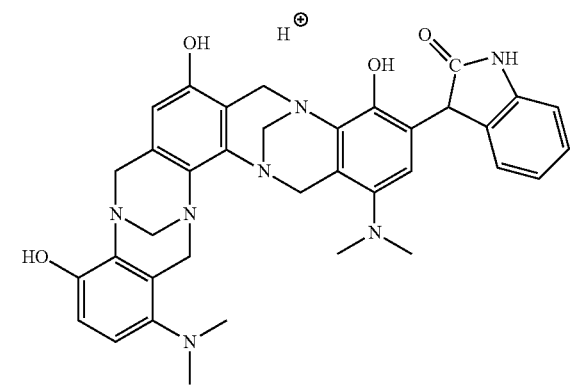

Chemical Formula: $C_{36}H_{38}N_7O_4^+$
Exact Mass: 632.29798

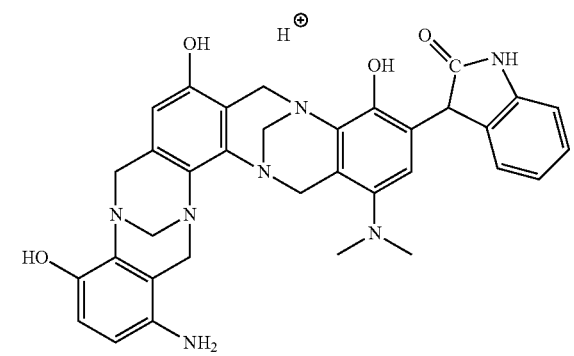

Chemical Formula: $C_{34}H_{34}N_7O_4^+$
Exact Mass: 604.26668

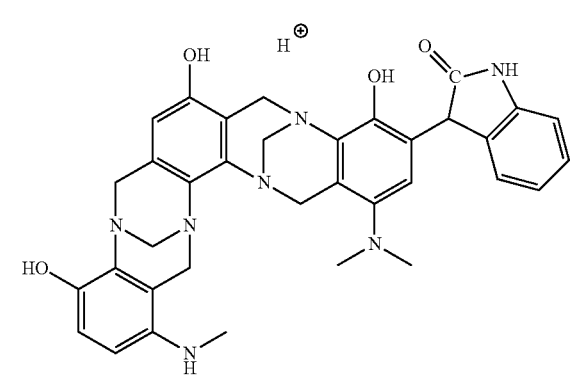

Chemical Formula: $C_{35}H_{36}N_7O_4^+$
Exact Mass: 618.28233

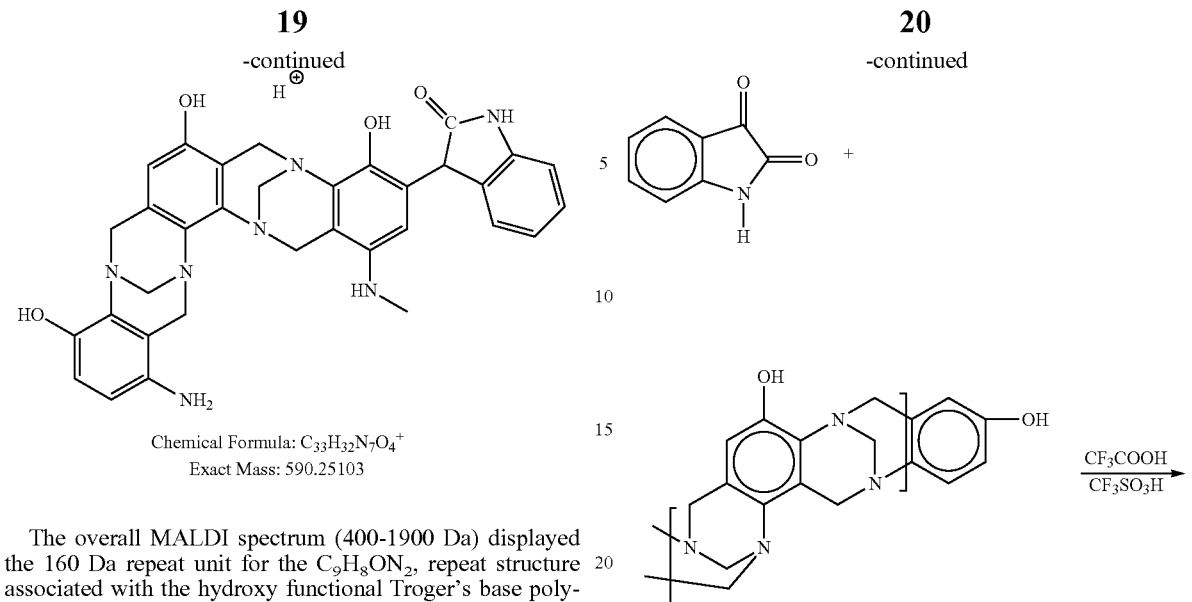

Chemical Formula: $C_{33}H_{32}N_7O_4^+$
Exact Mass: 590.25103

The overall MALDI spectrum (400-1900 Da) displayed the 160 Da repeat unit for the $C_9H_8ON_2$, repeat structure associated with the hydroxy functional Troger's base polymer for both the odd and even numbered mass series. The series displaying even masses is indicative of the addition of an odd number (e.g., 1, 3, 5, etc.) of isatin units (due to the nitrogen atom) forming the copolymer.

Thermal desorption and pyrolysis gas chromatographic/mass spectrometry analysis of the copolymer was performed. When analyzed at 420° C. and also at 650° C. the pyrolysis GC chromatograms revealed a unique peak at 15.01 minutes with m/z of 147 from copolymer fragmentation, with all other peaks the same as observed in analysis of a hydroxy functional Troger's base polymer standard under the same conditions. Analysis of isatin under the same conditions only gave a peak at 14.90 minutes and m/z of 133, with no m/z at 147 detected. The peak having m/z of 133 was not observed in the pyrolyzed copolymer chromatograms. The thermal desorption and pyrolysis gas chromatographic/mass spectrometry analysis demonstrated that there was no free isatin in the copolymer and a new peak observed at 15.01 minutes with m/z characteristic of the copolymer fragmenting to release isatin (m/z=147).

Example 2: Single Step Copolymerization of Isatin and Phenol Terminated Troger's Base Polymer of 2,4-Diaminophenol dihydrochloride; 4-Aminophenol; and Paraformaldehyde According to Reaction Pathway IX Reaction Pathway IX

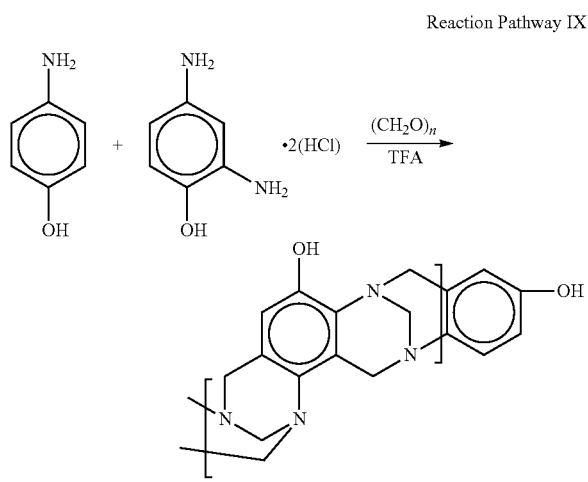

Approximately 2.07 g of 2,4-diaminophenol dihydrochloride, 0.98 g of 4-aminophenol, 1.80 g of paraformaldehyde and 30 mL of TFA were combined and stirred overnight. Approximately 1.12 g of isatin and 4.0 g of TFMSA were then added to the mixture followed by stirring overnight. The resulting mixture was transferred to an ice-containing vessel, followed by successive additions of 20% NaOH until pH 10 was achieved, followed by dropwise addition of HCl until a pH of 2-3 was achieved resulting in a thick tan slurry. The slurry was gravity filtered over paper and the resulting solids were washed with DI water and allowed to air dry, followed by drying at 100° C. under vacuum overnight. The resulting medium brown colored powder was then subject to TGA, DSC and MALDI MS analysis. TGA under nitrogen gave an onset of transition temperature (Td), end of Td, and volatiles (% weight) lost up to onset to Td after prehold at 150° C. for 60 minutes of 196° C., 254.9° C., and 2.49%, respectively. No events were detected by DSC analysis from 0° C. to 175° C. under nitrogen. Matrix-Assisted Laser Desorption/Ionization Time-of-Flight/Time-of-Flight Collision Induced Dissociation Mass Spectrometry (MALDI-TOF/TOF CID MS) detected numerous copolymer structures, including the following proposed structure:

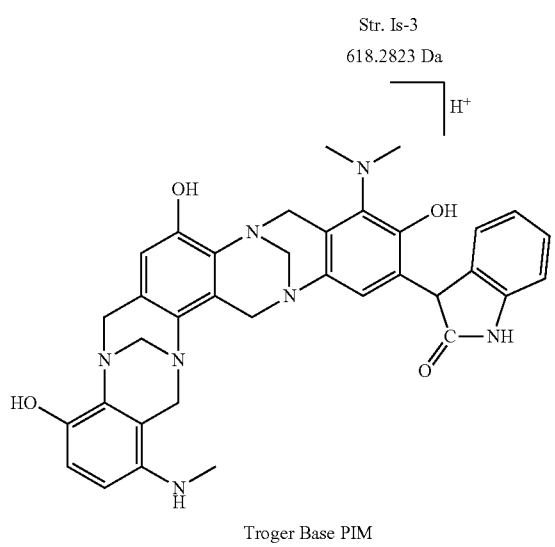

Str. Is-3
618.2823 Da
Troger Base PIM

The invention claimed is:

1. A polymer comprising a sub-unit including a Troger's base moiety, wherein the sub-unit is represented by Formula I:

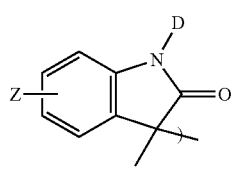

Formula I wherein:
- L is independently selected from at least one arylene group, and a multi-ring moiety,
- L' is independently selected from L or is not present,
- A and A' are not present or are independently selected from an isatin moiety with the proviso that at least one of A and A' is selected from an isatin moiety.

2. The polymer of claim 1 wherein at least one of L and L' are substituted with at least one of: i) a covalent crosslinking bond and ii) a polar functional group capable of reacting to forming a covalent crosslinking bond.

3. The polymer of claim 2 wherein the polar functional group is selected from at least one of: carboxylic acid and sulfonic acid and their corresponding salt or ester, cyanate and hydroxyl.

4. The polymer of claim 1 wherein L is selected from: phenylene, biphenylene, diphenylene ether, napthalene and spirobisindane.

5. The polymer of claim 1 wherein A is represented by Formula I':

Formula I' wherein Z is selected from hydrogen, cyanate, hydroxyl, alkyl, arylene, heteroarylene, alkyl ether, nitro, nitrile, carboxylic acid and sulfonic acid and their corresponding salt or ester, and D is selected from hydrogen and alkyl wherein the alkyl group may be unsubstituted or substituted with a hydroxyl, carboxylic acid, sulfonic acid and their corresponding salt or ester.

6. The polymer of claim 1 comprising a repeating unit represented by at least one of Formula II, III and IV:

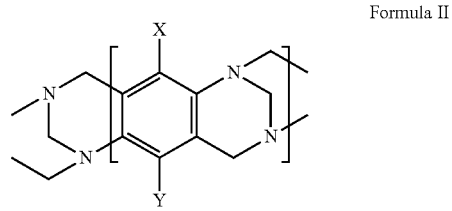

Formula II

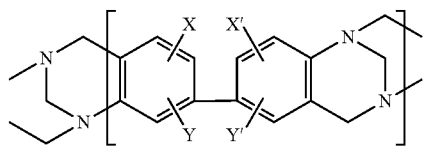

Formula III

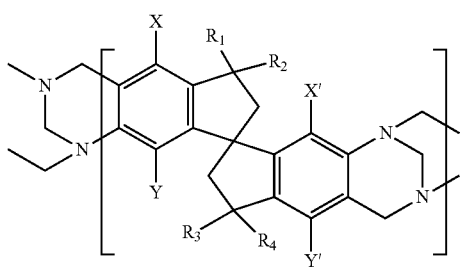

Formula IV wherein:
- X, Y, X' and Y' are independently selected from: A, hydrogen, carboxylic acid and sulfonic acid and their corresponding salt or ester, cyanate and hydroxyl with the proviso that at least one of X, Y, X' and Y' is A; and
- $R_1$, $R_2$, $R_3$, and $R_4$ are independently selected from hydrogen, alkyl groups comprising from 1 to 6 carbon atoms, and $R_1$ and $R_2$ may collectively form a ketone group or a 9,9'-fluorene group, and $R_3$ and $R_4$ may collectively form a ketone group or a 9,9'-fluorene group.

7. The polymer of claim 6 wherein the polymer is crosslinked through at least one of X, X', Y and Y'.

8. A membrane comprising the polymer of claim 1.

9. The membrane of claim 8 characterized by having an average pore size of from 0.2 to 20 nm as determined by ASTM F316-03 (2011).

* * * * *